United States Patent
Bonnevie et al.

(10) Patent No.: US 12,461,985 B2
(45) Date of Patent: Nov. 4, 2025

(54) SYSTEM AND METHOD FOR CREATING RESPONSIVE DISPLAY CONTENT

(71) Applicant: Google LLC, Mountain View, CA (US)

(72) Inventors: Mikaël Bonnevie, Walnut Creek, NY (US); Thomas Shimko, Mountain View, CA (US)

(73) Assignee: Google LLC, Mountain View, CA (US)

( * ) Notice: Subject to any disclaimer, the term of this patent is extended or adjusted under 35 U.S.C. 154(b) by 91 days.

(21) Appl. No.: 18/135,237

(22) Filed: Apr. 17, 2023

(65) Prior Publication Data
US 2023/0252104 A1   Aug. 10, 2023

Related U.S. Application Data

(63) Continuation of application No. 17/152,961, filed on Jan. 20, 2021, now Pat. No. 11,630,878.

(51) Int. Cl.
| | |
|---|---|
| *G06F 16/957* | (2019.01) |
| *G06F 16/583* | (2019.01) |
| *G06F 16/955* | (2019.01) |
| *G06T 5/70* | (2024.01) |

(52) U.S. Cl.
CPC ...... *G06F 16/9577* (2019.01); *G06F 16/5838* (2019.01); *G06F 16/9558* (2019.01); *G06T 5/70* (2024.01)

(58) Field of Classification Search
CPC .................................................. G06F 16/9577
See application file for complete search history.

(56) References Cited

U.S. PATENT DOCUMENTS

| | | |
|---|---|---|
| 2008/0275892 A1 | 11/2008 | Winter et al. |
| 2019/0082221 A1 | 3/2019 | Jain et al. |
| 2020/0082022 A1* | 3/2020 | Bonnevie et al. ........... G06F 17/30882 |
| 2022/0229878 A1* | 7/2022 | Bonnevie et al. .. G06F 16/9577 |

OTHER PUBLICATIONS

Written Opinion of the International Searching Authority, International application No. PCT/US2022/012679, mailed May 13, 2022, 8 pages.
International Search Report, International application No. PCT/US2022/012679, mailed May 13, 2022, 3 pages.
International Preliminary Report on Patentability, International application No. PCT/US2022/012679, mailed Jul. 20, 2023, 9 p. 2023.

* cited by examiner

*Primary Examiner* — James J Debrow
(74) *Attorney, Agent, or Firm* — Leason Ellis LLP

(57) ABSTRACT

A communication system is arranged to analyze image content; create a throne portion based on the image content; create a headline based on the image content; create a background based on the image content; and generate headline rendering instructions and background rendering instructions. The system can include a transmitter arranged to send the generated rendering instructions to an end-user communication device, which can be arranged to render the image content, headline, and background on a display device with the headline rendered on a throne portion and displayed partially in a container for the image content stacked atop of and offset with respect to the background.

20 Claims, 8 Drawing Sheets

SYSTEM AND METHOD FOR CREATING RESPONSIVE DISPLAY CONTENT

FIELD OF THE DISCLOSURE

The present disclosure relates to a communication system and method, and, more particularly, to a communication system and computer-implemented method that can analyze media content and generate responsive display content, including responsive display properties, that enhance display effects of the media content when rendered on a display of a communication device.

BACKGROUND OF THE DISCLOSURE

In a computer networked environment such as the Internet, content providers typically supply media content for rendering on end-user communication devices. The media content generally includes image, text or audio content. The media content can be linked to a webpage associated with a content provider. Frequently, the media content includes image content that, when rendered on the end-user communication devices, lacks adequate scalability or focus on a particular subject in the media content. There exists a need for a technological solution that can analyze media content and generate responsive display content with scalability and focus on a particular subject in the media content.

SUMMARY OF THE DISCLOSURE

In some embodiments, aspects of the disclosure provide a technological solution that can analyze media content and generate responsive display (RD) content to enhance one or more display effects, including scalability and focus on a particular subject in the media content.

In a nonlimiting embodiment of the disclosure, a communication system is provided for transmitting responsive display auxiliary content to an end-user communication device to be rendered in a container on a display device. The communication system comprises: a processor that is arranged to: analyze media content constituents, including image content; create a throne portion based on the image content; create a headline, including headline rendering instructions, based on the image content; create a background, including background rendering instructions, based on the image content; create image rendering instructions based on the headline and background; and generate responsive display auxiliary content, including the headline rendering instructions, background rendering instructions and image rendering instructions; and a transmitter arranged to send the responsive display auxiliary content to an end-user communication device arranged to render the responsive display auxiliary content on a display device with the headline rendered vertically on the throne portion and partially outside a viewport of a responsive display auxiliary container and the image content stacked atop of and offset with respect to the background.

In the communication system, the processor is arranged to: receive main display content; and combine the main display content with the responsive display auxiliary content.

In the communication system, the background can include a mirror image of the image content. The background can include at least one of a color overlay and a blurring overlay combined with the mirror image.

In the communication system, the throne portion can comprise a portion of a mirror image has an aspect ratio that is different from an aspect ratio of the image content.

In the communication system, the responsive display auxiliary content can include at least one of textual content, headline content, source identifier content, Uniform Resource Locator content or a call-to-action selector.

In the communication system, the background rendering instructions include an instruction, when executed by a web browser application on the end-user communication device, cause the end-user communication device to render the background in an upper portion of the viewport of the responsive display auxiliary container.

In another non-limiting embodiment, a computer-implemented method is provided for transmitting responsive display auxiliary content to an end-user communication device to be rendered on a display device. The method comprises: analyzing, by a processor, media content constituents, including image content; creating, by the processor, a throne portion based on the image content; creating, by the processor, a headline, including headline rendering instructions, based on the image content; creating, by the processor, a background, including background rendering instructions, based on the image content; creating, by the processor, image rendering instructions based on the headline and background; generating responsive display auxiliary content, including the headline rendering instructions, background rendering instructions and image rendering instructions; and transmitting the responsive display auxiliary content to an end-user communication device arranged to render the responsive display auxiliary content on a display device with the headline rendered vertically on the throne portion and partially outside a viewport of a responsive display auxiliary container and the image content stacked atop of and offset with respect to the background. The computer-implemented method can further comprise combining main display content with the responsive display auxiliary content to create responsive display content to be rendered on the display device by the end-user communication device.

In the computer-implemented method, creating the background can comprise generating a mirror image of the image content. Creating the background can comprise at least one of: creating a color overlay; and creating a blurring overlay. Creating the background can comprise combining the mirror image with at least one of the color overlay and the blurring overlay.

In the computer-implemented method, creating the throne portion can comprise generating a mirror image of the image content.

In the computer-implemented method, the responsive display auxiliary content can include at least one of textual content, headline content, source identifier content, Uniform Resource Locator content or a call-to-action selector.

In the computer-implemented method, the background rendering instructions include an instruction that, when executed by a web browser application on the end-user communication device, causes the end-user communication device to render the background in an upper portion of the viewport of the responsive display auxiliary container.

In another non-limiting embodiment, a non-transitory computer-readable storage medium is provided containing computer executable instructions that, when executed by a hardware processor of a first device, cause the processer to perform a method to transmit responsive display auxiliary content to a second device to be rendered on a display device, the method comprising: analyzing, by the hardware processor, media content constituents, including image content; creating, by the hardware processor, a throne portion based on the image content; creating, by the hardware processor, an a headline, including headline rendering instructions, based on the image content; creating, by the hardware processor, a background, including background rendering instructions, based on the image content; creating, by the hardware processor, image rendering instructions based on the headline and background; generating responsive display auxiliary content, including the headline rendering instructions, background rendering instructions and image rendering instructions; and transmitting the responsive display auxiliary content to an end-user communication device arranged to render the responsive display auxiliary content on a display device with the headline rendered vertically atop of the throne portion and partially outside a viewport of a responsive display auxiliary container and the image content stacked atop of and offset with respect to the background. Creating the background can comprise combining the mirror image with at least one of the color overlay and the blurring overlay. The responsive display auxiliary content can include at least one of textual content, headline content, source identifier content, Uniform Resource Locator content or a call-to-action selector.

The method can further comprise combining main display content with the responsive display auxiliary content to create responsive display content to be rendered on the display device by the end-user communication device.

The method can further comprise at least one of: generating a mirror image of the image content to create the background; creating a color overlay; and creating a blurring overlay.

Additional features, advantages, and embodiments of the disclosure may be set forth or apparent from consideration of the detailed description and drawings. Moreover, it is to be understood that the foregoing summary of the disclosure and the following detailed description and drawings provide nonlimiting examples that are intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure.

Figure 1:
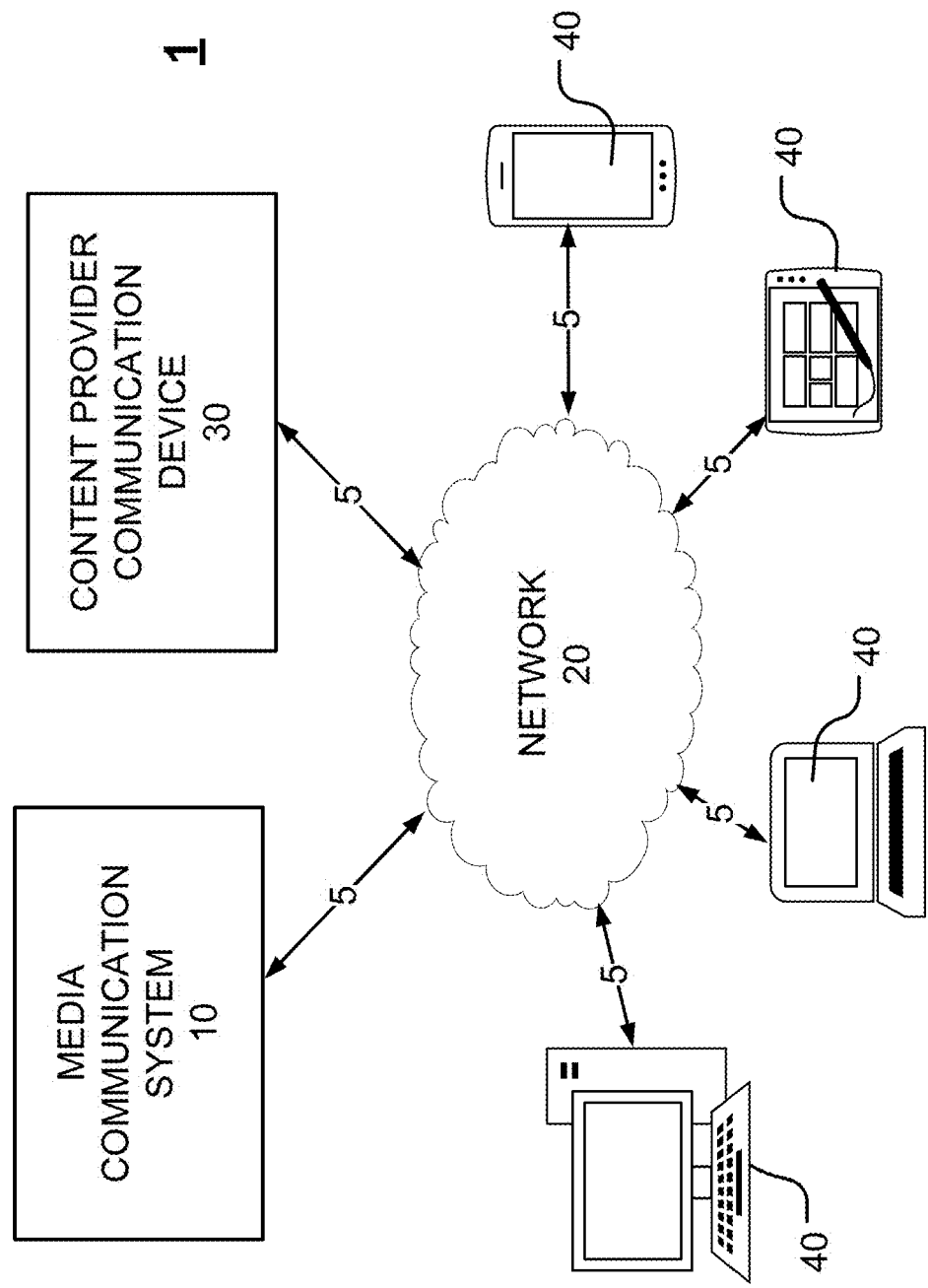
FIG. 1 is a block diagram depicting an implementation of a media communication system in a user environment, arranged according to the principles of the disclosure.

The present disclosure is further described in the detailed description that follows.

DETAILED DESCRIPTION OF THE DISCLOSURE

The disclosure and its various features and advantageous details are explained more fully with reference to the nonlimiting embodiments and examples that are described or illustrated in the accompanying drawings and detailed in the following description. It should be noted that features illustrated in the drawings are not necessarily drawn to scale and features of one embodiment can be employed with other embodiments as those skilled in the art would recognize, even if not explicitly stated. Descriptions of well-known components and processing techniques may be omitted so as to not unnecessarily obscure the embodiments of the disclosure. The examples are intended merely to facilitate an understanding of ways in which the disclosure can be practiced and to further enable those skilled in the art to practice the embodiments of the disclosure. Accordingly, the examples and embodiments should not be construed as limiting the scope of the disclosure. Moreover, it is noted that like reference numerals represent similar parts throughout the several views of the drawings.

FIG. 1 is a block diagram depicting an implementation of a media communication system 10 in an environment 1, arranged according to the principles of the disclosure. The environment 1 can include a network 20, a content provider (CP) communication device 30 and one or more end-user communication devices 40, any or all of which can be coupled to each other directly or via the network 20 through one or more communication links 5.

The communication system 10 can include a processor, a computer, a server, a storage device, a database, an interface or a communication device. The communication system 10 can include a communication device architecture 300 (shown in FIG. 5) or a communication device architecture 350 (shown in FIG. 6). The communication system 10 can include a responsive display content (RDC) generator system 100 (shown in FIG. 7). The communication system 10 can be arranged to carry out operations, for example, seen in FIG. 8. The communication system 10 can be configured to generate and send responsive display (RD) content to the end-user communication devices 40. The RD content can include main display (MD) content and responsive display auxiliary (RDA) content that can be rendered on the end-user communication devices 40. The RDA content can be created by the communication system 10 based on raw media (RM) content received from the CP communication device 30.

The RM content received from the CP communication device 30 can include raw media (RM) content constituents, such as, for example, cleartext content, image content, source identifier content, headline content and Uniform Resource Locator (URL) address content. The cleartext content can include a word, a phrase, a description, a title or a headline. The image content can include an image of an animal, person, place or thing. The source identifier content can include a logo, a symbol, a color scheme or any displayable article that can identify a provider of a product or a service.

Figure 2:
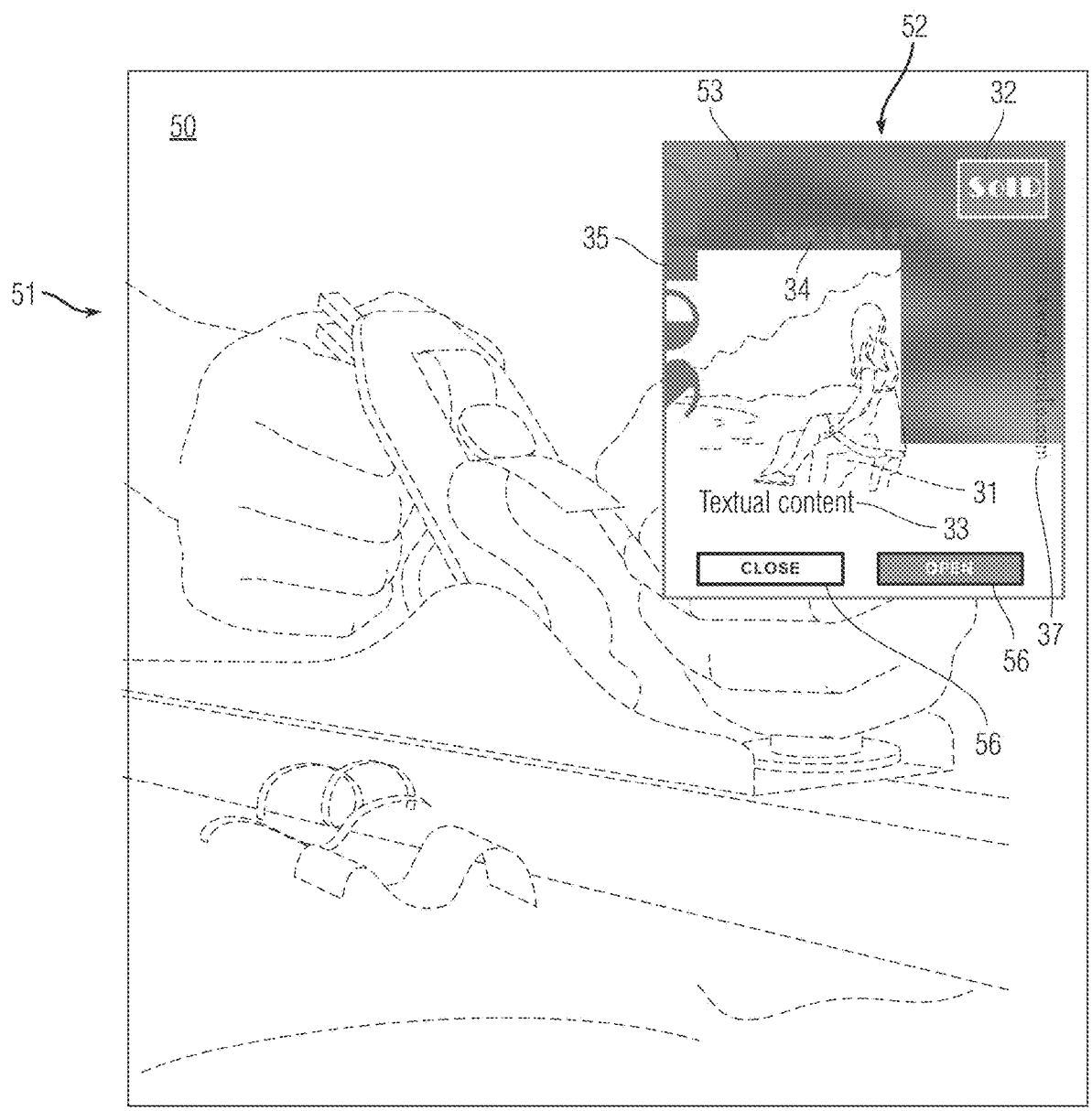
FIG. 2 shows a nonlimiting example of responsive display content that can be received by an end-user communication device and rendered on a display screen of a display device.
Figure 3:
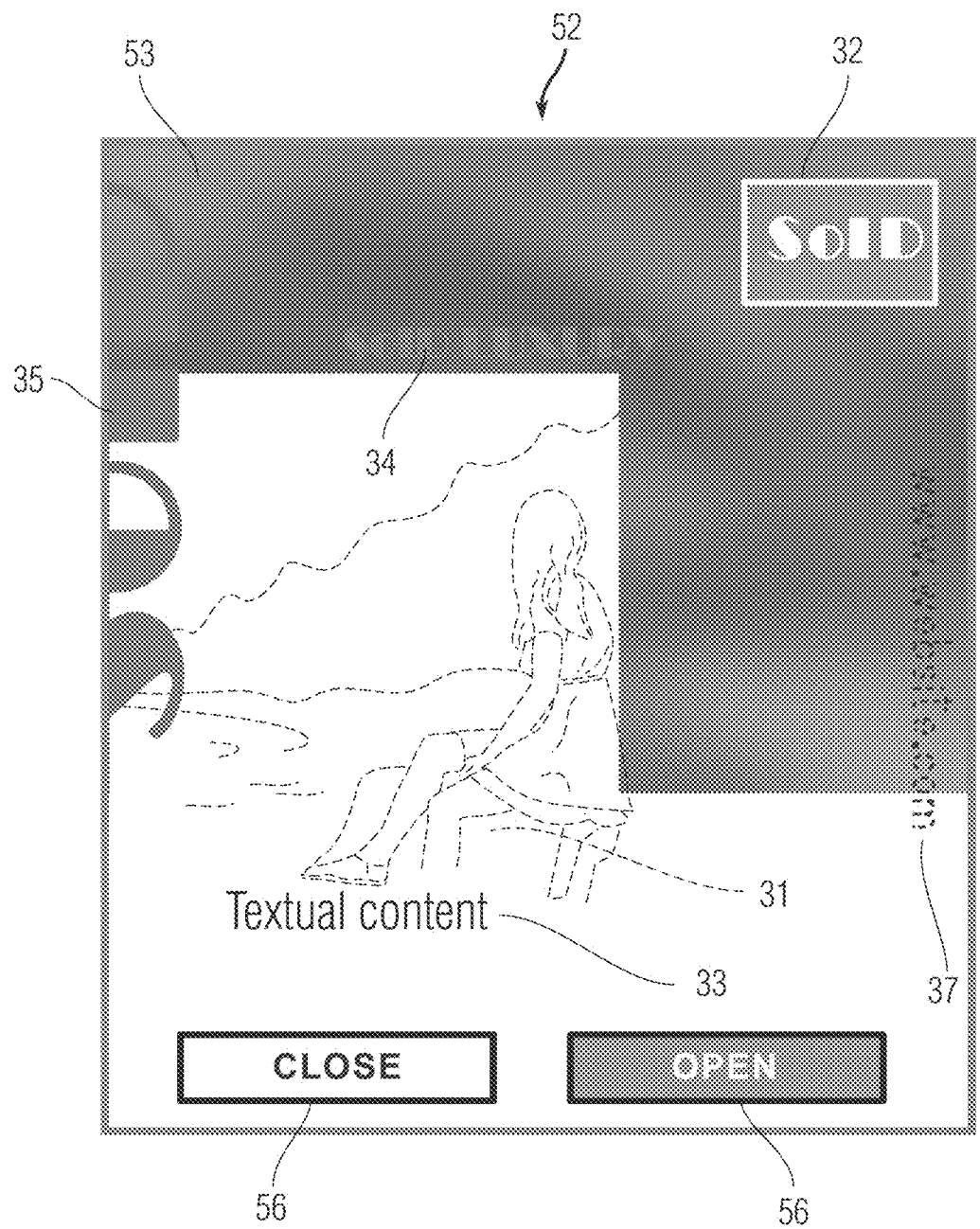
FIG. 3 shows a nonlimiting example of responsive display auxiliary content included I the responsive display content in FIG. 2.
Figure 6:
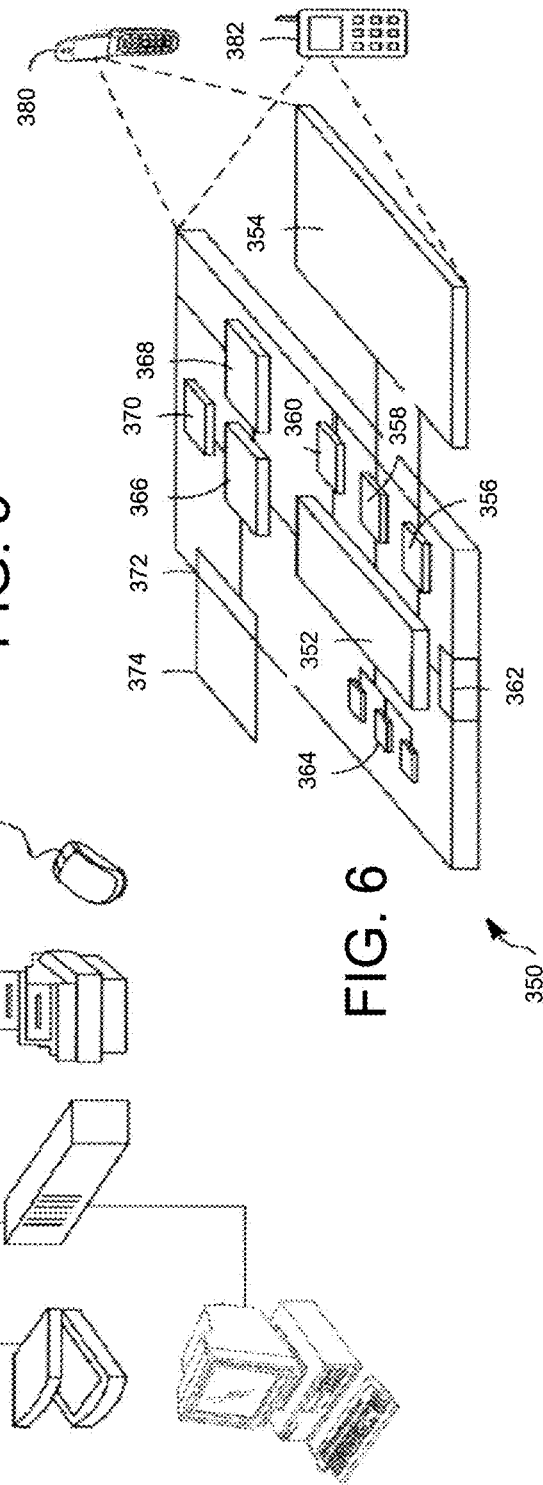
FIG. 6 is a block diagram depicting a nonlimiting embodiment of an end-user communication device.

FIG. 2 shows a nonlimiting example of the RD content that can be received from the communication system 10 by one or more of the end-user communication devices 40 and displayed on a display screen 50 of a display device (for example, display device 354, shown in FIG. 6). In this nonlimiting example, the RD content includes main display (MD) content 51 and display responsive auxiliary (RDA) content 52. An enlarged view of the RDA content 52 is shown in FIG. 3. The RD content, including MD content 51 and RDA content 52, can be reproduced by the end-user communication device(s) 40, for example, via a responsive display rendering (RDR) application executed by a processor (for example, processor 352, shown in FIG. 6) in the communication device 40. The RD content can include any displayable or audible content that can be reproduced by the end-user communication device 40. The RDA content 52 can be received with or without the MD content 51 and displayed on the end-user communication device 40.

The RDR application can be generated or modified by the communication system 10 and downloaded to each end-user communication device 40. The RDR application can include, for example, a browser application that can be installed and run on the end-user communication device 40. The RDR application can, when executed by the processor 352 (shown in FIG. 6), convert, for example, HyperText Markup Language (HTML), Cascading Style Sheets and JavaScript into a working website or webpage that can be interacted with by an operator of the end-user communication device 40, such as, for example, through a user interface.

The MD content 51 can include, for example, video/audio content, streaming video/audio content, or a webpage or website, or a search results page or a landing page of a search operator. In the non-limiting example seen in FIG. 2, the MD content 51 includes a video image of a person planing a piece of wood using a hand plane.

The RDA content 52 can include, for example, a content provider source identifier, text, an image, a logo, a video, a URL address, or a sound. The RDA content 52 can include, for example, an advertisement, a pop-up or pop-out advertisement, a message, a picture-in-picture image or message, a banner advertisement or any other content that can be included in, superimposed onto or reproduced (including displayed) with the MD content 51, or rendered or displayed by itself on the end-user communication device 40, without the MD content 51.

In the nonlimiting example seen in FIGS. 2 and 3, the RDA content 52 includes a picture-in-picture (PIP), a pop-up or a pop-out responsive display auxiliary (RDA) container. The RDA container can include an outer perimeter defined by, for example, lines, as seen, for example, in FIGS. 2 and 3. The inner perimeter (if any) of the RDA container can define a viewport to the visible portion of the RDA content when it is rendered on the end-user communication device 40. The inner perimeter of the RDA container can be defined by the same lines as the outer perimeter in the nonlimiting example in FIGS. 2 and 3. Depending on the thickness of those lines, the inner and outer perimeters can be substantially the same or significantly differ. The lines can have any shape, size, thickness, color, or texture. In an alternative embodiment, the RDA container can be rendered without any lines or with a special effect, such as, for example, a blurring or a smoothed transition where the outer edges of the RDA content 52 can be gradually blended together with the MD content 51 to provide a smooth indiscernible transition.

Referring to FIG. 3, the RDA content 52 can include an image 31 of a woman sitting on a boulder by a lake surrounded by mountains. The RDA content 52 can include a source identifier 32 (for example, "SoID"), textual content 33, headline content 34 (for example, "SoID LUXURY"), a milieu 53 and one or more call-to-action (CTA) selectors 56. The milieu 53 comprises a background to be displayed within the container. The RDA content 52 can include an oddment 35. The oddment 35 can include a textual headline. The RDA content 52 can include a URL address 37. The oddment 35 can include a partial rendering of the headline content 34 (for example, a portion of "SoID LUXURY"). For example, the oddment 35 can include headline content "SoID LUXURY," as seen in FIGS. 2 and 3, which is purposely positioned vertically and outside the viewport. The RDA content 52 can be created by the communication system 10 (shown in FIG. 1) and sent with (or without) the MD content 51 to the end-user communication devices 40 (shown in FIG. 1).

Figure 4:
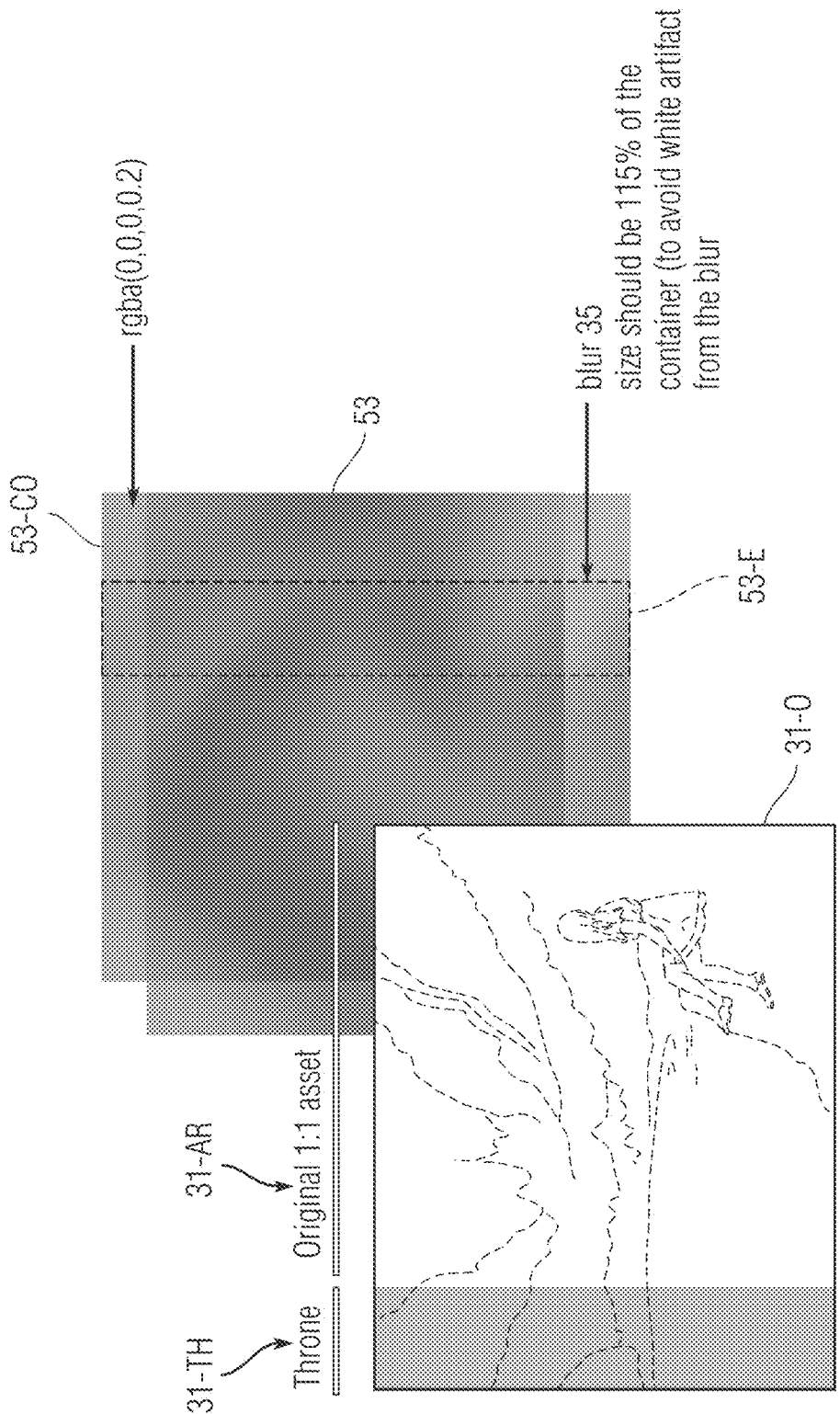
FIG. 4 shows a nonlimiting example of creating milieu content based on original image content.

FIG. 4 shows a nonlimiting embodiment of a milieu generating process that can be carried out to create the milieu 53 (shown in FIGS. 2 and 3) comprising the background of some or all of the RDA container. In this embodiment, the milieu 53 has a background which includes a blurry backdrop that can be created a blur and a color overlay as all or part of the background, as well as cropping to avoid white or grey artifacts from appearing, such as, for example, around edges of the milieu 53. The milieu 53 can be created with or include a portion of the original image content 310. In the nonlimiting example seen in FIGS. 2 and 3, the milieu 53 includes background content comprised of a blurry background that is created by reusing the image with blur and color overlay, as well as cropping to avoid white/grey artifacts around the edges. The milieu 53 can be generated by, for example, assigning a portion of the RDA container for the milieu 53 and generating a mirror image of the original image content 31-O with an altered aspect ratio (for example, from a 1:1 aspect ratio to a 1:1.5 aspect ratio) and, for example, adding a color and blur overlay layer onto the mirror image. The color for the color blur overlay can be selected based on either the original image content 31-O, the source identifier 32 (for example, a color of a logo) or any other part of the RDA content to create a cohesive composition.

In an embodiment, the oddment 35 can be created by, for example, taking the headline content 34 and positioning it vertically and outside the viewport of the RDA container, for example, such that only a portion of the headline content 34 is visible, as seen in FIG. 3.

In an embodiment, the URL address 37 (for example, <www.website.com>) can be positioned vertically in the viewport of the RDA container, as seen in FIG. 3.

Figure 9:
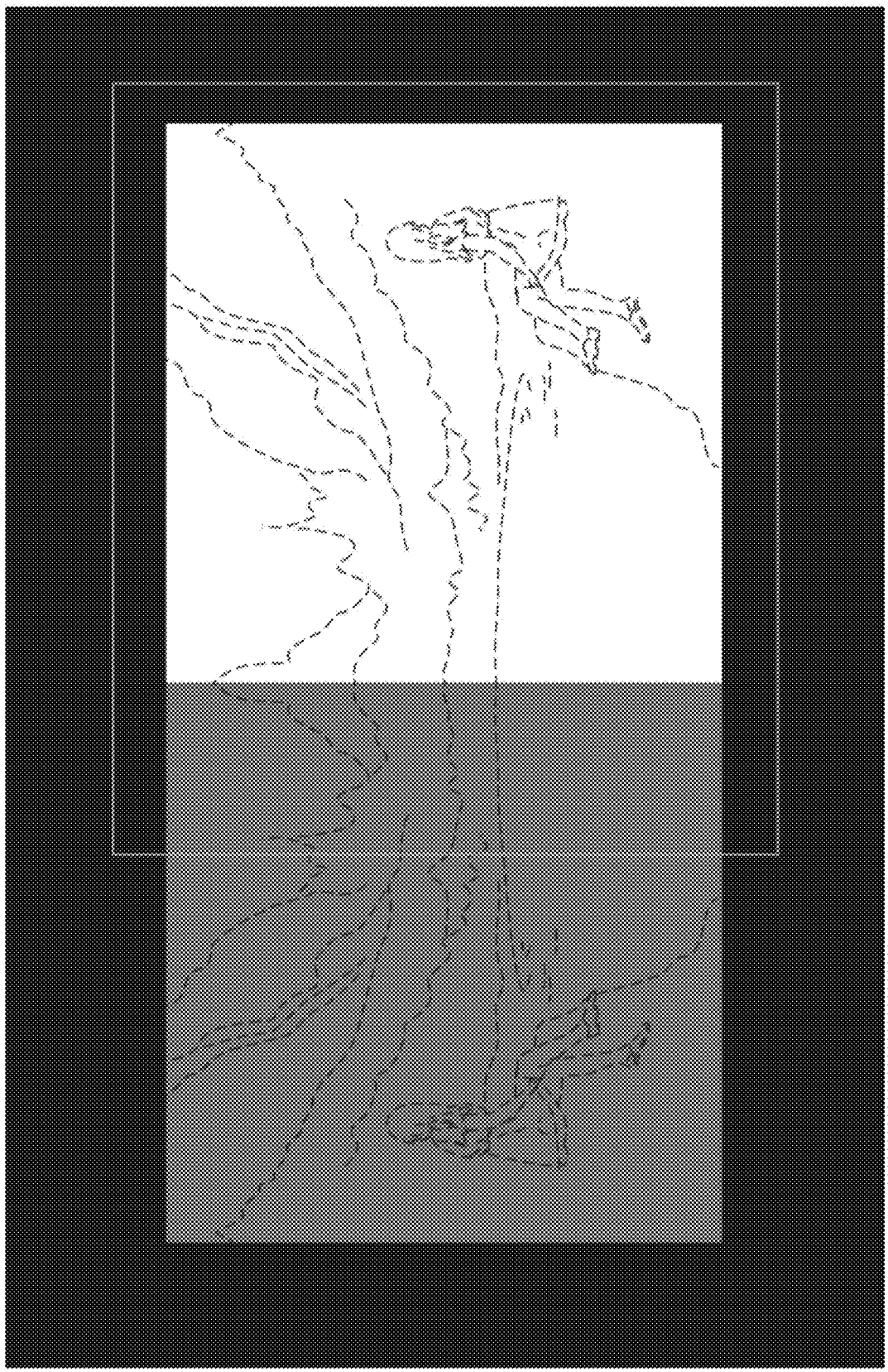
FIG. 9 shows a nonlimiting example of mirror original image content.

In the nonlimiting example seen in FIG. 4, the original image content 31-O can be analyzed and used to render the image 31 and milieu 53 in the RDA container, in which the image 31 can be stacked atop of and offset from the milieu 53, as seen in FIG. 3. The original image content 31-O can be analyzed and used to construct a "throne" portion 31-TH with an original image portion 31-AR. As will be appreciated, the "throne" portion is a special seat that provides a background for rendering text, such as a headline which can be within or only partially within the boundary of the RDA container. The original image portion 31-AR can include the original image content 31-O. The throne portion 31-TH can include a portion of a mirror image of the original image content 31-O, as seen in FIG. 9. In the non-limiting example shown in FIG. 9, the mirror image of the image content 31-O can be created by artificial intelligence (AI) reconstruction or image mirror, as will be understood by those skilled in the art. The throne portion 31-TH can be designated, for example, for overlay by the oddment 35 (shown in FIG. 3); and the original image portion 31-AR can be designated for rendering as the image 31. Thus, the oddment 35 can be overlayed atop of the throne portion 31-TH and appear to be overlayed on the image content, without actually overlaying any part of the original image content 31-O.

Referring to FIG. 9, the throne portion 31-TH can be generated by mirroring the original image content 31-O and a composite of the throne portion 31-TH and original image content 31-O can be arranged to be rendered in the viewport of the RDA container by adjusting the aspect ratio such that both a portion of the mirror image (that is, the throne portion 31-TH) and original image content 31-O can be rendered within the viewport of the RDA container.

In the nonlimiting example seen in FIG. 3, the milieu 53 can be generated by selecting a section of the original image portion 31-AR (shown in FIG. 4), generating a mirror image 55-E (shown in FIG. 4) of the original image portion 31-AR and overlaying or stacking the original image 31-O atop of the mirror image 55-E. As noted above, a color 53-CO and/or a blur overlay can be added atop of the mirror image 55-E.

The color overlay 55-CO can be created by selecting a color based on the original image content 31-O and creating a color overlay layer, which can be substantially uniform in color over a portion or the entire area of the color overlay 53-CO. The color overlay 53-CO can be overlayed atop of either or both the mirror image 55-E and blur layer to create a cohesive composition that places or directs focal attention on or to the image 31, or the source identifier 32, headline content 34 or oddment 35.

The RDA content 52 can include rendering instructions and data for all the content to be rendered in the RDA container. For instance, the RDA content 52 can include computer program instructions or code that, when executed by the processor 352 (shown in FIG. 6), cause the end-user communication device 40 to render the RDA content 52 in an RDA container on the display screen 50 of the display device 352 (shown in FIG. 6). The RDA content 52 can include instructions to display the RDA container in any location on the display screen 50 or having any size or aspect ratio based on, for example, properties or specifications of the particular display device on the end-user communication device 40, and to populate the RDA container with the RDA content 52.

As seen in FIG. 3, the RDA content 52 can include instructions and data to render one or more CTA selectors 56 on the display screen 50. The CTA selector 56 can include a radio button, a hyperlink, or a selectable item that can trigger or initiate a call-to-action by the end-user communication device 40, such as, for example, to access a file or a particular website or webpage on the Internet. The CTA selector 56 can be arranged to cause the end-user communication device to connect and linked to a webpage or a website belonging to the content provider, which can be hosted, for example, by the CP communication device 30 (shown in FIG. 1).

The RD content, which includes RDA content with (or without) MD content, can include computer program instructions or code (and data) that, when executed by the processor 352 (shown in FIG. 6), causes the end-user communication device 40 to render the RDA content 52 (shown in FIG. 2), including the image 31, source identifier 32, textual content 33, oddment 35, URL 37, milieu 53 and/or one or more CTA selectors 56. The rendering instructions and data, when executed by the processor 352, can cause the end-user communication device 40 to render the RDA container and RDA content 52 having a predetermined shape, size, texture, color or location, or another special effect such as, for example, a blurring effect, a zoom-in effect, a zoom-out effect, a fade-in effect, or a fade-out effect, among others, that can emphasize or highlight the main subject (for example, image 31, shown in FIG. 3) in the RDA content.

In the nonlimiting example seen in FIG. 3, the original image content 31-O (shown in FIG. 4) is rendered as the image 31 without any changes and without any overlays, while the oddment 35 is purposely positioned vertically and outside the viewport of the RDA container (as seen in FIGS. 2 and 3) and the headline content 34 is purposely located above the image 31 and below the source identifier 32, thereby facilitating directing of viewer focal attention to the image 31 or source identifier 32. The milieu 53 further facilitates direction of viewer focal attention to the image 31 or source identifier 32. The layout of the RDA content 52 can be arranged to emphasize the image 31, source identifier 32, textual content 33, or CTA selector(s) 56.

Referring to FIG. 1, the media communication system 10 (or CP communication device 30) can include a search engine server of a search engine operator that operates a search engine website. The MD content 51 (shown in FIG. 2) can include MD content of a search engine webpage, such as, for example, a search results webpage or a landing webpage. The MD content include the results of a search or the landing webpage displayed with an RDA container that includes the RDA content 52. The RDA container can include, for example, a container slot on the search results webpage or landing webpage.

Figure 5:
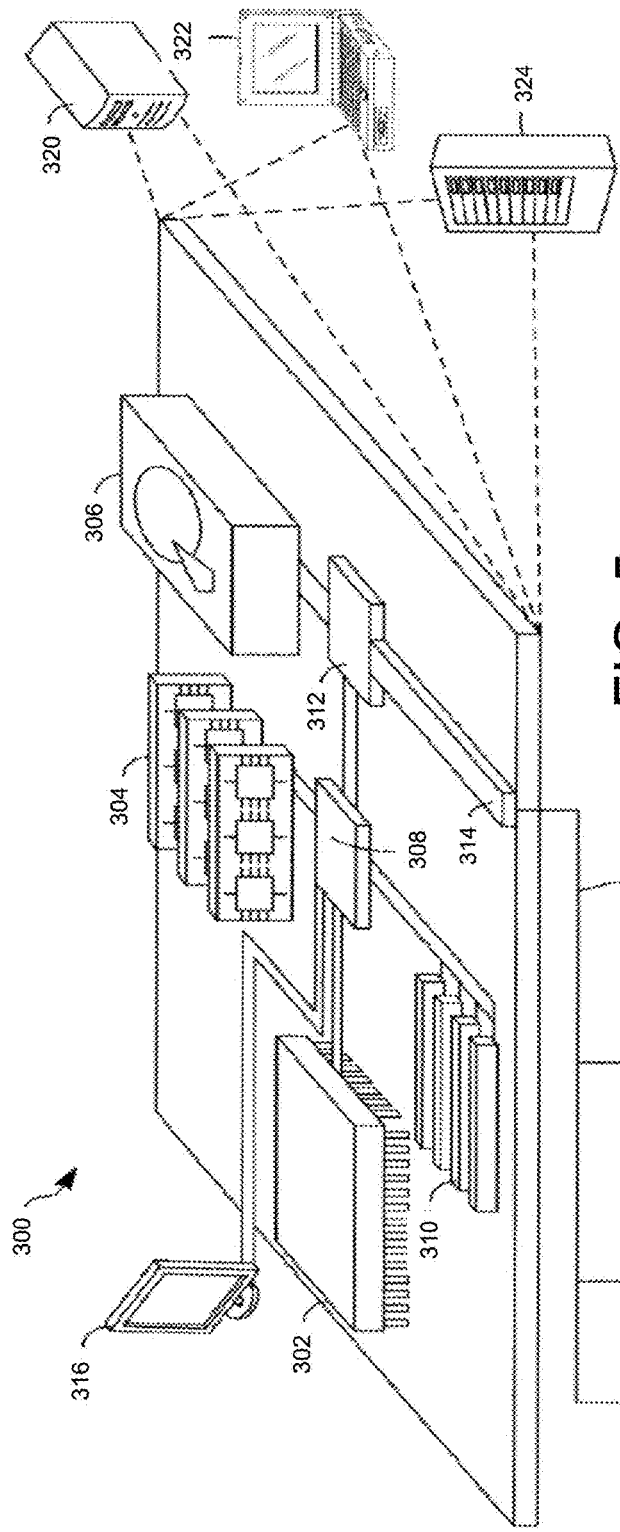
FIG. 5 is a block diagram depicting a nonlimiting embodiment of a communication device included in a media communication system.

The CP communication device 30 can include the communication device architecture 300, shown in FIG. 5. The CP communication device 30 can include the RDC generation system 100, shown in FIG. 7. The CP communication device 30 can be operated, for example, by a content provider, to create, modify or provide raw media (RM) content or main display (MD) content to be reproduced by the end-user communication devices 40.

FIGS. 5 and 6 show non-limiting examples of the communication device architectures 300 and 350, respectively, including associated computing resource assets that can be used to implement the systems and methods described herein. The communication device architecture 300 (or 350) can be included in the media communication system 10 or the CP communication device 30 (shown in FIG. 1); and the communication device architecture 350 (or 300) can be included in the end-user communication device 40 (shown in FIG. 1). The communication device architecture 300 (or 350) can include the RDC generation system 100 (shown in FIG. 7). The computing resource assets shown in FIGS. 5-7, their connections and relationships, and their functions, are meant to be exemplary only, and are not meant to limit implementations of the disclosure.

The communication device architecture 300 includes a processor 302, memory 304, a storage device 306, a high-speed interface 308 connecting to memory 304 and high-speed expansion ports 310, and a low speed interface 312 connecting to low speed bus 314 and storage device 306. Each of the components 302, 304, 306, 308, 310, and 312, can be interconnected using various busses, and may be mounted on a common motherboard or in other manners as appropriate. The processor 302 can include the processor 110 (shown in FIG. 7). The processor 302 can process instructions for execution within the media communication system 10 (or CP communication device 30), including instructions stored in the memory 304 or on the storage device 306 to display graphical information for a graphic user interface (GUI) on an external input/output device, such as display 316 coupled to high-speed interface 308. In other implementations, multiple processors and/or multiple buses can be used, as appropriate, along with multiple memories and types of memory. Also, the media communication system 10 can be connected, with each device providing portions of the necessary operations (for example, as a server bank, a group of blade servers, or a multi-processor system).

The memory 304 stores information within the media communication system 10. In one implementation, the memory 304 can include a volatile memory unit or units. In another implementation, the memory 304 can include a non-volatile memory unit or units. The memory 304 can include another form of computer-readable medium, such as a magnetic or optical disk.

The storage device 306 is capable of providing mass storage. The storage device 306 can include the storage 120 (shown in FIG. 7). In one implementation, the storage device 306 can be or can contain a computer-readable medium, such as a floppy disk device, a hard disk device, an optical disk device, or a tape device, a flash memory or other similar solid-state memory device, or an array of devices, including devices in a storage area network or other configurations. A computer program product can be tangibly embodied in a non-transitory computer-readable medium. The computer program product can contain instructions that, when executed, perform one or more methods, such as those included in this disclosure. The computer-readable medium can include an information carrier such as the memory 304, the storage device 306, or memory on processor 302.

The high-speed controller 308 can manage bandwidth-intensive operations for the media communication system 10, while the low-speed controller 312 can manage lower bandwidth-intensive operations. Such allocation of functions is exemplary only. In one implementation, the high-speed controller 308 is coupled to memory 304, display 316 (for example, through a graphics processor or accelerator), and to high-speed expansion ports 310, which can be arranged to accept various expansion cards (not shown). In the implementation, low-speed controller 312 is coupled to storage device 306 and low-speed expansion port 314. The low-speed expansion port, which may include various communication ports (for example, USB) may be coupled to one or more input/output devices, such as a keyboard, a pointing device, a scanner, or a networking device such as a switch or router, for example, through a network adapter.

The media communication system 10 can be implemented in a number of different forms, as seen in FIG. 5. For example, it can be implemented as a standard server 320, or multiple times in a group of such servers. It can also be implemented as part of a rack server system 324. In addition, it can be implemented in a personal computer such as a laptop computer 322. Alternatively, computing resource assets from the media communication system 10 can be combined with other computing resource assets in a mobile device, such as the CP communication device 30 or one or more end-user communication devices 40. Each of such computing resource assets can contain one or more of the devices, and an entire system may be made up of multiple devices communicating with each other through communication links.

As seen in FIG. 6, the communication device architecture 350 includes a processor 352, memory 364, an input/output device such as a display 354, a communication interface 366, and a transceiver 368, among other computing resource assets. The device architecture 350 can also be provided with a storage device, such as a microdrive or other device, to provide additional storage. Each of the computer resource assets 352, 364, 354, 366, and 368, are interconnected using various communication links, buses, and several of the computing resource assets can be mounted on a common motherboard or in other manners as appropriate.

The processor 352 can execute instructions within the end-user communication device 40, including instructions stored in the memory 364. The processor can be implemented as a chipset of chips that include separate and multiple analog and digital processors. The processor can provide, for example, for coordination of the other computing resource assets of the device 40, such as control of user interfaces, applications run by device 40, and wireless communication by device 40.

Processor 352 can communicate with a user through control interface 358 and display interface 356 coupled to a display 354. The display 354 can be, for example, a TFT LCD (Thin-Film-Transistor Liquid Crystal Display) or an OLED (Organic Light Emitting Diode) display, or other appropriate display technology. The display interface 356 can comprise appropriate circuitry for driving the display 354 to present graphical and other information to a user. The control interface 358 can receive commands from a user and convert them for submission to the processor 352. In addition, an external interface 362 can be provided in communication with processor 352, so as to enable near area communication of device 40 with other devices. External interface 362 can provide, for example, for wired communication in some implementations, or for wireless communication in other implementations, and multiple interfaces can also be used.

The memory 364 stores information within the end-user communication device 40. The memory 364 can be implemented as one or more of a computer-readable medium or media, a volatile memory unit or units, or a non-volatile memory unit or units. Expansion memory 374 can also be provided and connected to device 40 through expansion interface 372, which can include, for example, a SIMM (Single In Line Memory Module) card interface. Such expansion memory 374 can provide extra storage space for device 40, or can also store applications or other information for device 40. Specifically, expansion memory 374 can include instructions to carry out or supplement the processes described above and can include secure information also. Thus, for example, expansion memory 374 can be provided as a security module for device 40 and can be programmed with instructions that permit secure use of device 40. In addition, secure applications can be provided via the SIMM cards, along with additional information, such as placing identifying information on the SIMM card in a non-hackable manner.

The memory can include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 364, expansion memory 374, or memory on processor 352, which can be received, for example, over transceiver 368 or external interface 362.

The end-user communication device 40 can communicate wirelessly through communication interface 366, which can include digital signal processing circuitry where necessary. Communication interface 366 can provide for communications under various modes or protocols, such as GSM voice calls, SMS, EMS, or MMS messaging, CDMA, TDMA, PDC, WCDMA, CDMA2000, or GPRS, among others. Such communication can occur, for example, through radio-frequency transceiver 368. In addition, short-range communication can occur, such as using a BLUETOOTH, WiFi, or other such transceiver (not shown). In addition, GPS (Global Positioning System) receiver module 370 can provide additional navigation- and location-related wireless data to device 40, which can be used as appropriate by applications running on device 40.

The end-user communication device 40 can also communicate audibly using audio codec 360, which can receive spoken information from a user and convert it to usable digital information. Audio codec 360 can generate audible sound for a user, such as through a speaker, for example, in a handset of device 40. Such sound can include sound from voice telephone calls, can include recorded sound (for example, voice messages, music files, etc.) and can also include sound generated by applications operating on device 40.

The communication device architecture 350 can be implemented in a number of different forms, as seen in FIG. 6. For example, it can be implemented as a cellular telephone 380. It can also be implemented as part of a smart phone 382, personal digital assistant, or other similar mobile device.

Referring to FIGS. 1 and 6, the end-user communication device 40 can be arranged to communicate via the network 20 and to display content such as the RD content 51, 52 on the display screen 50 of the display device 354 (shown in FIG. 6). Using the user interface on the end-user communication device 40, a user can submit requests to receive MD (or RD) content. The requests can include requests to a search engine, in which case the requests can include search queries. In some implementations, the requests can include a request to access a webpage or website. The RD content can be received by the end-user communication device 40 from the media communication system 10. The received RD content can include RDA content, which may have originated from the CP communication device 30.

The end-user communication device 40 can reproduce the RD content on the display device 352 (shown in FIG. 6), including any RDA content that might have been included in the RD content. For instance, the end-user communication device 40 can display the MD content 51 (shown in FIG. 2) or a results webpage or a landing webpage (not shown), filling one or more RDA containers (for example, one shown in FIG. 2) in or atop of the MD content with the RDA content 52 (shown in FIG. 2). The RDA content 52 can be displayed by itself, without the MD content 51. The RDA container can be dynamic and can be automatically adjusted in terms of position, layout, shape, or size on the display screen 50 (shown in FIG. 2). The RDR application can be stored and executed in the end-user communication device 40 or stored and/or executed elsewhere in the environment 1, such as, for example, in the media communication system 10.

The RDR application can include markup language annotations for identifying content and creating structured documents, including images, text, links, sounds, and other objects. The markup language annotations can include a plurality of tags for displaying media content, including, for example, the MD content 51 and/or RDA content 52 (shown in FIG. 2) on the display screen 50 of the end-user communication device 40. The markup language can include, for example, Standard Generalized Markup Language (SGML), Scalable Vector Graphics (SVG), HTML, Extensible Markup Language (XHTML or XML), XML User Interface Language (XUL), or LaTeX. The markup language annotations can be provided as a markup language file that can be executed by, for example, a web browser running in the end-user communication device 40 to render the RD content on the display device 354 (shown in FIG. 6). The RDR application can include the web browser in the end-user communication device 40. Alternatively, the web browser in the end-user communication device 40 can include the RDR application.

The RDR application can include style sheet language annotations for providing rules for stylistics and for describing the presentation of the content and document with the markup language annotations, such as, for example, the markup language file. The style sheet language annotations can include, for example, colors, fonts, layouts, and other stylistic properties. The style sheet language can include, for example, CSS, Document Style Semantics and Specification Language (DSSSL), or Extensible Stylesheet Language (XSL). The style sheet language annotations can be provided as a style sheet language file. Alternatively, the style sheet language annotations can be incorporated into the file containing the markup language annotations.

The RDR application can include scripting language instructions to create interactive effects related to the markup language annotations or style sheet language annotations. The scripting language can include, for example, Bash (for example, for Unix operating systems), ECMAScript (or JavaScript) (for example, for web browsers), Visual Basic (for example, for Microsoft applications), Lua, or Python. The scripting language instructions can include instructions that when executed by, for example, the web browser on the end-user communication device 40 effect rendering of RD content, such as, for example, seen in FIGS. 2 and 3, on the display device 354 (shown in FIG. 6). The scripting language instructions can be provided as a scripting language file. Alternatively, the scripting language instructions can be incorporated into the file containing the markup language annotations.

The RDR application can include a document object model (DOM) such as for HTML or XML (for example, DOM5 HTML) that can create object-oriented representations of the content or documents that can be modified with the scripting language instructions. A DOM includes a cross-platform and language-independent convention for representing and interacting with objects in HTML, XHTML/XML, SGML, SVG, or XUL. As used herein, a document can refer to the DOM's underlying document.

The RDR application can be configured to be executable by the processor 352 (shown in FIG. 6) and can follow a model-view-controller (MVC) design pattern for user interfaces. According to the MVC design pattern, an application can be divided into three areas of responsibility, including: (1) the Model, which includes the domain objects or data structures that represent the application's state; (2) the View, which observes the state and generates an output to the users; and (3) the Controller, which translates user input into operations on the model.

Figure 7:
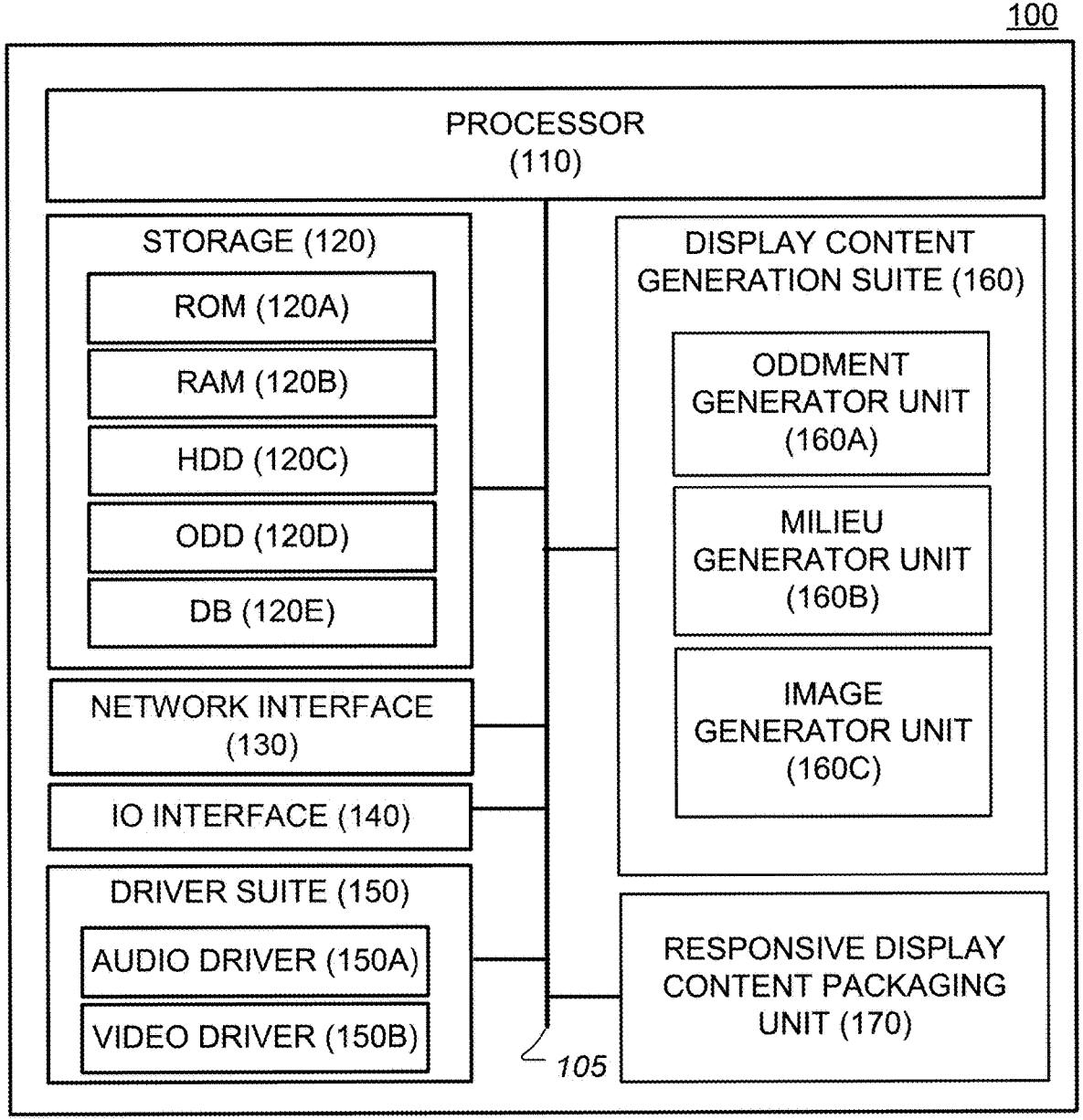
FIG. 7 is a block diagram depicting a nonlimiting embodiment of a responsive display content generator system.

FIG. 7 is a block diagram depicting a non-limiting embodiment of the responsive display content (RDC) generator system 100, constructed according to the principles of the disclosure. The RDC generation system 100 can be configured to implement the various aspects of the embodiments described. As noted above, the RDC generation system 100 can be included in any one or more of the media communication system 10, the CP communication device 30 or the end-user communication devices 40. The RDC generation system 100 can include (or can be included in) the communication device architecture 300 (shown in FIG. 5) or 350 (shown in FIG. 6). The RDC generation system 100 can include a suite of computer resource assets 130 to 170 that can be download to and/or installed on the media communication system 10 (or the end-user communication devices 40).

A nonlimiting embodiment of the RDC generation system 100 can be arranged to create or modify RDA content to enhance, highlight or direct focal attention of a user of the end-user communication device 40 to an image, textual content or a source identifier rendered in the RDA container on the display device of the device 40. Through creation of the RDA content, image rendering can be provided that improves visibility and recognizability of RDA content on the end-user communication device 40 while simultaneously allowing for maximum scalability, whether it is display screen aspect ratio, length of text or image colors. The RDA content can include vertical oddment alignment with original image display and overall composition that can emphasize and direct attention to the image 31, source identifier 32, textual content 33, headline content 34, URL content 37 or CTA selector 56 (shown in FIG. 3).

The RDC generation system 100 can include a processor 110, a storage 120, a network interface 130, an input-output (IO) interface 140, a driver suite 150, a display content generation (DCG) suite 160 and a responsive display content (RDC) packaging unit 170. The DCG suite 160 and the RDC packaging unit 170 can be comprised in a single computing resource asset (not shown) or provided as separate computing resource assets, as seen in FIG. 7. The RDC generation system 100 can include a bus 105, which can be connected to any or all of the computer resource assets 110 to 170 by communication links. The bus 105 can be connected to the architectures 300 or 400 (shown in FIGS. 5 and 6).

Any one or more of the computing resource assets 110 to 170 can include a unique and separate computing device, as seen in FIG. 7, or two or more of the computing resource assets can be integrated or integratable as a single computing device. Any of the computing resource assets 120 to 170 can include a computer resource that can be executed on the processor 110 as one or more computing resource processes. The computer resources can be contained in the storage 120.

The bus 105 can include any of several types of bus structures that can further interconnect to a memory bus (with or without a memory controller), a peripheral bus, and a local bus using any of a variety of commercially available bus architectures.

The processor 110 can include any of various commercially available processors. The processor 110 can include a computing device. Dual microprocessors and other multiprocessor architectures can be employed as the processor 110. The processor 110 can include a central processing unit (CPU) or a graphic processing unit (GPU). The processor 110 can be arranged to interact with any of the computer resource assets 120 to 180 to carry out or facilitate with the processes described herein. The processor 110 can be further arranged to interact with the computer resource assets in the architectures 300 and 400 (shown in FIGS. 3 and 4).

The storage 120 can include a read-only memory (ROM) 120A, a random-access memory (RAM) 120B, a hard disk drive (HDD) 120C, an optical disk drive (ODD) 120D, and a database (DB) 120E. The storage 120 can provide non-volatile storage of data, data structures, and computer-executable instructions, and can accommodate the storage of any data in a suitable digital format.

The storage 120 can include a computer-readable medium that can hold executable or interpretable computer code (or instructions) that, when executed by the processor 110, cause the steps, processes and methods in this disclosure to be carried out. The computer-readable medium can be contained in the HDD 120C or ODD 120D. The computer readable medium can include sections of computer code that, when executed by the processor 110, cause the RDC generation system 100 to analyze raw media (or RM) content, such as, for example, RM content received from the CP communication device 30 (shown in FIG. 1), and generate oddment rendering instructions and data, milieu rendering instructions and data and image rendering instructions and data, and package the rendering instructions and data to be transmitted as RDA content (for example, RDA content 52, shown in FIG. 3) to the end-user communication devices 40 (shown in FIG. 1).

A basic input-output system (BIOS) can be stored in the non-volatile memory 120A, which can include, for example, a ROM, an erasable programmable read-only memory (EPROM), or an electrically erasable programmable read-only memory (EEPROM). The BIOS can contain the basic routines that help to transfer information between any one or more of the computing resource assets 110 to 170 in the system 100, such as during start-up.

The RAM 120B can include dynamic random-access memory (DRAM), a synchronous dynamic random-access memory (SDRAM), a static random-access memory (SRAM), or another high-speed RAM for caching data.

The HDD 120C can include, for example, an enhanced integrated drive electronics (EIDE) drive, a serial advanced technology attachments (SATA) drive, or any suitable hard disk drive for use with big data. The HDD 120C can be configured for external use in a suitable chassis (not shown).

The ODD 120D can be arranged to read or write from or to a compact disk (CD)-ROM disk (not shown) or read from or write to other high capacity optical media such as a digital versatile disk (DVD).

The HDD 120C or ODD 120D can be connected to the bus 105 by a hard disk drive interface (not shown) and an optical drive interface (not shown), respectively. The hard disk drive interface (not shown) can include a Universal Serial Bus (USB) (not shown), an IEEE 1394 interface (not shown), and the like, for external applications.

The DB 120E can store machine learning (ML) training datasets and ML testing datasets for building and/or training a machine learning (ML) model. For example, for an embodiment of the DCG suite 160 that includes a machine learning platform, a display content generation (DCG) model can be built and trained to perform the operations of an oddment generator unit 160A, milieu generator unit 160B and image generator unit 160C. In that embodiment, the operations of the DCG suite 160 can be carried out by the processor 110, according to the DCG model, as executed computer resource processes on a machine learning (ML) platform. The training datasets can be updated periodically (or continuously) with updated parametric values, such as, for example, during parametric tuning of the DCG model.

Any number of computer resources can be stored in the storage 120, including, for example, a program module, an operating system, an application program, an application program interface (API), or program data. The computing resource can include an API such as, for example, a web API, a simple object access protocol (SOAP) API, a remote procedure call (RPC) API, a representation state transfer (REST) API, or any other utility or service API. Any (or all) of the operating system, application programs, APIs, program modules, and program data can be cached in the RAM 120B as executable sections of computer code.

The API can include an API for a markup language such as, for example, SGML, SVG, HTML, XHTML/XML, XUL, or LaTeX.

The API can include an API for a style sheet language, such as, for example, CSS, DSSSL, or XSL. The API can include a web-based API, an operating system API, a database system API, a computer hardware API, or a library API. The API can include, for example, one or more of the APIs available at <<https://developers.google.com>>.

The API can include one or more APIs that connect webpages to scripts or programing languages, including modelling (for example, SGML, SVG, HTML, XHTML/XML, XUL) documents as objects.

The API can include a document object model (DOM) API, such as for HTML or XML (for example, DOM5 HTML), that can create object-oriented representations of webpages that can be modified with a scripting module (not shown) in the DCG suite 160. A DOM can include a cross-platform and language-independent convention for representing and interacting with objects in HTML, XHTML/XML, SGML, SVG, or XUL.

The network interface 130 can be connected to the network 20 (shown in FIG. 1), which can include the Internet. The network interface 130 can include a wired or a wireless communication network interface (not shown) or a modem (not shown). When used in a local area network (LAN), the RDC generation system 100 can be connected to the LAN network through the wired or wireless communication network interface; and, when used in a wide area network (WAN), the RDC generation system 100 can be connected to the WAN network through the modem. The modem (not shown) can be internal or external and wired or wireless. The modem can be connected to the system bus 105 via, for example, a serial port interface (not shown). The network interface 130 can include a receiver (not shown), a transmitter (not shown) or a transceiver (not shown).

The input-output (IO) interface 140 can receive commands or data from an operator via a user interface (not shown), such as, for example, a keyboard (not shown), a mouse (not shown), a pointer (not shown), a stylus (not shown), a microphone (not shown), a speaker (not shown), or a display device (not shown). The received commands and data can be forwarded from the IO interface 140 as instruction to data signals, via the bus 105, to any of the computer resource assets 110 to 170.

The driver suite 150 can include an audio driver 150A and a video driver 150B. The audio driver 150A can include a sound card, a sound driver (not shown), an interactive voice response (IVR) unit, or any other device necessary to render a sound signal on a sound production device (not shown), such as for example, a speaker (not shown). The video driver 150B can include a video card (not shown), a graphics driver (not shown), a video adaptor (not shown), or any other device necessary to render an image signal on a display device (not shown).

The DCG suite 160 can include a supervised machine learning platform or an unsupervised machine learning platform. The ML platform can include, for example, a Word2vec deep neural network, a convolutional architecture for fast feature embedding (CAFFE), an artificial immune system (AIS), an artificial neural network (ANN), a convolutional neural network (CNN), a deep convolutional neural network (DCNN), region-based convolutional neural network (R-CNN), you-only-look-once (YOLO), a Mask-RCNN, a deep convolutional encoder-decoder (DCED), a recurrent neural network (RNN), a neural Turing machine (NTM), a differential neural computer (DNC), a support vector machine (SVM), a deep learning neural network (DLNN), Naive Bayes, decision trees, logistic model tree induction (LMT), NBTree classifier, case-based, linear regression, Q-learning, temporal difference (TD), deep adversarial networks, fuzzy logic, K-nearest neighbor, clustering, random forest, rough set, or any other machine intelligence platform capable of supervised or unsupervised learning for analyzing and identify or predicting objects and things in media content. The machine learning platform can include the DCG ML model (or DCG model) that can analyze RM content, such as, for example, received from the CP communication device 30 (shown in FIG. 1), and generate responsive display auxiliary (RDA) content, such as, for example, RDA content 52 (shown in FIG. 3).

The DCG suite 160 can include the oddment generator unit 160A, milieu generator unit 160B and the image generator unit 160C, each of which can be arranged as a separate computing resource asset (shown in FIG. 7) or integrated with each other or another computer resource asset (not shown). The oddment generator unit 160A, milieu generator unit 160B and image generator unit 160C can be arranged to interact with each other to create RDA content that has a cohesive composition and directs focal attention to a region (for example, image 31, source identifier 32, textual content 33, oddment content 35, URL 37 or CTA selector 56, shown in FIG. 3) of the RDA content when rendered on the display device of the end-user communication device 40. The DCG suite 160 can be arranged to receive the RM content from, for example, the CP communication device 30 (shown in FIG. 1) and parse from the RM content, for example, cleartext content, image content, source identifier content, headline content, and URL content.

The DCG suite 160 can be arranged to interact with responsive display content (RDC) packaging unit 170 to packetize the RDA content with display rendering instructions and data that, when executed by, for example, a web browser on the end-user communication device 40 (shown in FIG. 1), cause the device 40 to render the RDA content (for example, RDA content 52, shown in FIG. 3) on its display device. The RDC packaging unit 170 can be further arranged to assemble RD content for transmission to the end-user communication device by combining the RDA content with MD content. The RD content can be assembled and packetized based on, for example, an RTP (Real-Time Transport), UDP (User Datagram Protocol) or IP (Internet Protocol) protocol stack and sent to the end-user communication device 40.

The oddment generator unit 160A can be arranged to analyze the image content (for example, original image 31-O, shown in FIG. 4), source identifier or the headline content, and generate oddment content, including oddment rendering instructions and data that can be used, for example, by the web browser executing in the end-user communication device 40 (shown in FIG. 1), to render the oddment content 35 in the RDA content 52, as seen, for example, in FIG. 3. The oddment content 35 can be rendered to include the headline content 34 positioned vertically and outside the viewport of the RDA container such that only a portion of the headline content is visible.

The oddment content 35 can include, for example, a string containing one or more textual characters, numbers, symbols or any displayable articles that can be rendered on the display device of the end-user communication device 40 (shown in FIG. 1) such that the string can be positioned vertically and partially outside the viewport of the RDA content container, as seen, for example, in FIG. 2. The oddment content 35 can include a color, font, size, shape, texture or type that can be selected or created by the oddment generator 160A based on the particular image content 31, source identifier 32, textual content 33, or headline content 34, such that the RDA content 52 can be rendered as a cohesive composition by the end-user communication device 40.

The milieu generator unit 160B can be arranged to analyze the image content, source identifier, textual content and headline content and generate milieu content that provides a cohesive composition with each or any of the foregoing, including avoiding or eliminating any artifacts around the edges of any of the foregoing, including the edges around the image content. The milieu content can be rendered as a background in the RDA container (for example, as seen in FIG. 3), and rendered such that it occupies more than half (≥50%) of the visible area of the RDA container, as also seen in FIG. 3. The milieu content can be rendered so that it occupies 50%, less than 50% or more than 50% of the visible area of the RDA container when it is rendered on the display device of the end-user communication device 40, for example, as seen in FIG. 3. The milieu content can be generated to be rendered in an upper portion of the RDA container (as seen in FIG. 3), a lower portion of the RDA container (not shown), or any other portion of the RDA container.

Referring to the nonlimiting example of RDA content 52 illustrated in FIG. 3, the milieu generator unit 160B can be arranged to create the milieu content 53 by, for example, applying uncropping or mirroring technology to the original image content 31-O (shown in FIG. 4) and changing the aspect ratio of the original image content 31-O from, for example, 1:1 to 1:1.15 of the width (or height) of the RDA container and applying a blur and color overlay with cropping. Other aspect ratio transformations are contemplated here, including, for example, greater than 1:1.15 (for example, 1:1.5) or less than 1:1.15 (for example, 1:1.1). As seen in FIG. 4, the milieu content 53 can be created to include the blur overlay for the expanded mirror image 53-E of the original image content 31-O, as well as the color overlay 53-CO. The blur and/or color overlays, and/or the expanded mirror image 53-E, can be cropped to avoid or eliminate any artifacts that might otherwise be created by the blurring technology, such as, for example, white or gray artifacts that might appear around the edges of the RDA container. The milieu generator unit 160B can be arranged to select a color for the color overlay 53-CO by, for example, analyzing the original image content 31-O, source identifier, or headline content to and matching the color to any portion (or entirety) of the RDA content to create a cohesive composition. The milieu generator unit 160B can be arranged to select a region (for example, 60% of upper portion) of the RDA container in which to render the milieu content.

The image generator unit 160C can be arranged to analyze the image content and interact with the oddment generator unit 160A and milieu generator unit 160B to determine a region of the RDA container in which to render the original image content. The image generator unit 160C can be arranged to create a mirror image of the original image content 31-O (shown in FIGS. 4 and 9) and select a throne portion 31-TH of the mirror image, which can then be overlayed with the oddment 35, without overlaying or otherwise modifying the original image content 31-O.

Referring to the non-limiting example of the RDA content 52 illustrated in FIG. 3, the image generator unit 160C can be arranged to scale and position the image content 31 (including original image content 31-O and throne portion 31-TH) such that it stacks atop of the milieu 53 and occupies, for example, about thirty percent (30%) of the overall height to the RDA container. The image content 31 can be positioned such that it is offset with respect to the milieu content 53, for example, having about fifteen percent (15%) of the total height of the image content 31 positioned below the bottom of the milieu 53. The image 31 can be rendered without any special effects or modifications, other than scaling or positioning, such that the original image 31-O (shown in FIG. 4) is rendered in the RDA container in its original form, with the throne portion 31-TH arranged to be overlayable by the oddment 35.

The RDC packaging unit 170 can receive the RDA content from the DCG suite 160, including the oddment content rendering instructions and data from the oddment generator unit 160A, milieu content rendering instructions and data from the milieu generator unit 160B and image content rendering instructions and data from the image generator unit 160C. The RDC packaging unit 170 can assemble and packetize the RDA content (with or without MD content) for transmission to the end-user communication devices 40 such that a web browser executing in the end-user communication device 40 can render the RDA content on the display device.

Figure 8:
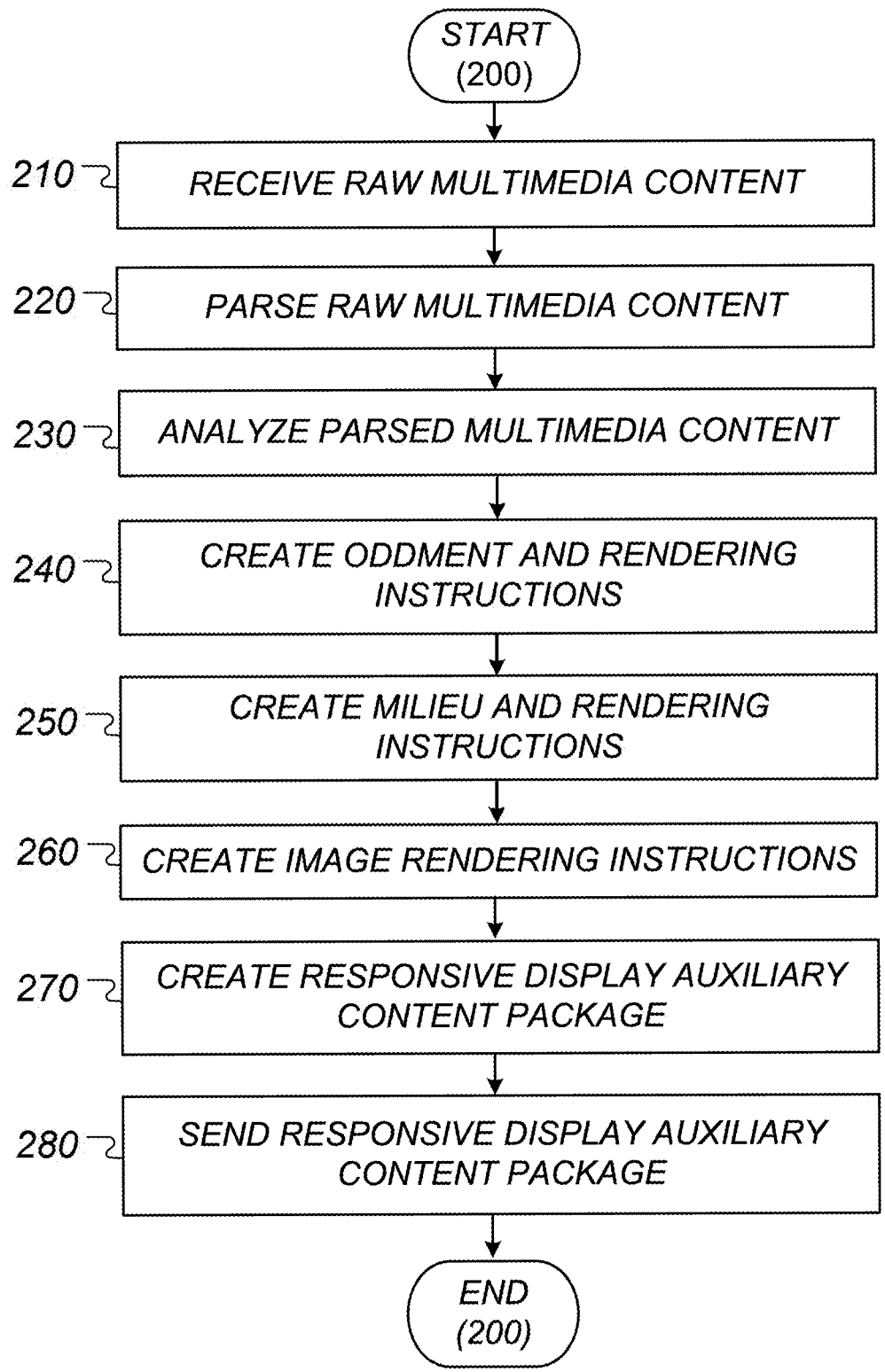
FIG. 8 is a diagram depicting a nonlimiting embodiment of an operation of a responsive display content generator system.

FIG. 8 shows a nonlimiting embodiment of an operation that can be performed by the RDC generator system 100, according the principles of the disclosure. The storage 120 (shown in FIG. 7) can include a non-transitory computer-readable medium containing computer program instructions or code that, when executed by the processor 110 (shown in FIG. 7) can cause the RDC generator system 100 to perform each of the steps 210 to 280 (shown in FIG. 8).

Referring to FIGS. 7 and 8 together, through execution of the processor 110, raw media (RM) content can be received by the RDC generator system 100 from, for example, the CP communication device 30 (shown in FIG. 1) (Step 210). The RM content can be received, for example, by the network interface 130 and parsed into RM content constituents, including image content, source identification content, textual content, headline content and URL content (Step 220). The RM content constituents can be forwarded to the DCG suite 160 for analysis (Step 230).

In an alternative embodiment in which the DCG suite 160 is comprised of a plurality of computing resources, the RM content constituents can be analyzed by the processor 110 by, for instance, executing one or more computer resource processes by running the computing resources in the DCG suite 160. In this embodiment, the oddment generator unit 160A, milieu generator unit 160B and image generator unit 160C can each be comprised of a computing resource that is executable by the processor 110.

Based on an analysis of the image content, source identification content, textual content, headline content and/or URL content (Step 230), the oddment generator unit 160A can create an oddment (for example, oddment 35, shown in FIG. 3) for inclusion in the RDA content, as well as rendering instructions and data for rendering the oddment in an RDA container (Step 240). The oddment generator unit 160A can be arranged to identify a throne portion 31-TH (shown FIG. 4) and the image content 31-O (shown in FIG. 4), as well as a corresponding throne portion in the milieu 53

(shown in FIG. 4), on which the oddment can be overlayed. The oddment generator unit 160A can be arranged to take the headline content, position it vertically, such as, for example, along and atop the throne portion 31-TH and a portion of the milieu 53, and outside the viewport of the RDA container such that only a portion of the headline content is visible in the viewport of the RDA container, as seen in FIG. 3. The oddment can be adjusted in size or aspect ratio for desired effect. The oddment 35 can be created with the same or a different font, color, size, texture, or shape than the source identifier content 32, textual content 33, headline content 34, URL content 37 or CTA selectors 56 that are to be rendered in the RDA container (shown in FIG. 3).

The milieu and associated rendering instructions and data can be created by the milieu generated unit 160B based on an analysis of the image content, source identification content, textual content and/or headline content (Step 250). For instance, as seen in the embodiment depicted in FIG. 4, the milieu 53 includes a blurry backdrop as part of the background that can be created by reusing a portion of the original image content 31-O with a blur and a color overlay, as well as cropping to avoid white or grey artifacts from appearing, such as, for example, around edges of the milieu 53. The milieu 53 can be generated by, for example, assigning a portion of the RDA container for the milieu 53 and generating a mirror image of the original image content 31-O with an altered aspect ratio (for example, from a 1:1 aspect ratio to a 1:1.5 aspect ratio) and, for example, adding a color and blur overlay layer onto the mirror image. The color for the color blur overlay can be selected based on either the original image content 31-O, the source identifier 32 (for example, a color of a logo) or any other part of the RDA content to create a cohesive composition. The portion of the RDA container allocated to the milieu 53 can include the upper portion of the viewport, as seen in FIG. 3, a lower portion of the viewport of the RDA container (not shown), a left-side portion of the RDA container (not shown), a right-side portion of the RDA container (not shown) or any other portion of the RDA container suitable for creating a desired effect, such as, for example, directing a viewer's attention to a focal point on the RDA content 52 (shown in FIG. 3).

The RDA container can be rendered, for example, as a rectangle having its longer sides aligned parallel with the vertical edges of the display screen 50 (shown in FIG. 3) or aligned parallel with the horizontal edges of the display screen 50 (such as, for example, in a landscape layout, which is not shown). Other shapes for the RDA container are contemplated, as well, such as, for example, a circle shape, a square shape, an ellipse shape, a triangle shape, or any other shape, depending on, for example, the particular MD content or RDA content to be rendered on the end-user communication device 40 (shown in FIG. 1).

The milieu rendering instructions can include, for example, instructions to select a section of the original image portion 31-AR (shown in FIG. 4), generate a mirror image 55-E (shown in FIG. 4) of the original image portion 31-AR and overlay a color 53-CO and/or a blur overlay atop of the mirror image 55-E. The mirror image 55-E, color overlay 53-CO and/or blur overlay can be scaled to have an area larger than the viewport of the RDA container, such that the edges of each of the foregoing are outside the viewport, thereby avoiding any artifacts from being visible in the viewport, which might otherwise appear.

As noted earlier, the color overlay 55-CO can be created by selecting a color based on the original image content 31-O and creating a color overlay layer, which can be substantially uniform in color over a portion or the entire area of the color overlay 53-CO. The color overlay 53-CO can be overlayed atop of either or both the mirror image 55-E and blur layer to create a cohesive composition that places or directs focal attention to a particular section of the RDA content, such as, for example, on the image 31, source identifier 32, headline content 34, oddment 35, URL 37 or CTA selector 56 (shown in FIG. 3).

The original image content 31-O can be analyzed by the image generator unit 160C to create image rendering instructions and data (Step 260). The image generator unit 160C can be arranged to analyze the milieu content, including associated rendering instructions and data generated by the milieu generator 160B (in Step 250), and determine a position and size of the image 31 to be rendered in the RDA container. For instance, the image generator unit 160C can create rendering instructions and data to render the image 31 as a stacked image, with the image 31 stacked atop of and offset with respect to the milieu 53, as seen in FIG. 3. The image rendering instructions can include an instruction to maintain the image in its original form, without any overlays or other special effects being applied to the image 31, and/or to generate a throne portion 31-TH (shown in FIGS. 4 and 9) for overlaying by the oddment 35.

It is noted that the Steps 230 to 260 can be performed in the sequence indicated in FIG. 8, or two or more of the Steps can be performed substantially simultaneously or in a different sequence.

Once the RDA content constituents have been created, including associated rendering instructions and data, the constituents can be assembled by the RDC packaging unit 170 to create an RDA content package (Step 270). The RDA constituents can include the image content 31, source identifier content 32, textual content 33, milieu content 35, URL 37 and CTA selectors 56, including all associated rendering instructions and data. The RDA content package can be transmitted to the end-user communication device 40 (Step 280). In this regard, the RDA content package can be combined with MD content and transmitted to the end-user communication device 40 (shown in FIG. 1) as RD content, such that the MD content and RDA content can be rendered on the display of the device 40, as seen, for example, in FIG. 2.

The RDA content can be received by the end-user communication device 40 and parsed into its RDA content constituents, which can then be processed by a web browser executing in the end-user communication device 40 to render the RDA content 53 (shown in FIGS. 2 and 3) in an RDA container on the display device.

As noted earlier, the end-user communication device 40 can include the RDR application, which can include computer executable code or instructions or sets of instructions that, when executed by the processor in the end-user communication device 40, causes the device 40 to render the RDA container with RDA content. The RDR application can include one or more rules for the display of the RDA content on the end-user communication device 40, including, for example, one or more rules that define how and where on the display screen the RDA container and RDA content are to be rendered by the end-user communication device 40 based on the rendering instructions and data.

For instance, the rules in the RDR application can define, when displaying the RDA content, one or more colors, one or more textures, one or more sizes, or other effects that direct attentional to a focal point in the RDA content. The rules can further define, when rendering the RDA content, one or more colors, one or more fonts, one or more textures, one or more sizes, or one or more layouts.

The RDA application can include rules that define how each RDA content constituent is to be displayed on the end-user communication device 40, including, for example, dimensions, location and orientation.

The RDA application can include one or more rules that define the layout for rendering the RDA content, with or without the MD content, on the end-user communication device 40.

In the case of HTML5, the RDA application can include an audio tag (e.g., an instruction to embed an audio file/link in the displayed screen and how to play it), a video tag (e.g., an instruction to embed video in the displayed screen and how to play it), a source tag (e.g., can be used with audio or video to identify a source for the audio or video), an embed tag (e.g., an instruction to embed specified media type for content that might lack support within other media elements), a canvas tag (e.g., an instruction to set aside part of the display screen), a svg tag (e.g., an instruction to embed vector graphics (e.g., object, text, overlay and/or background) encoded with SVG markup language, to allow graphics (e.g., objects, text, overlay and/or background) to be scaled dynamically to the area and shape of the display screen without losing any graphic quality), and the like. As understood by those skilled in the art, the RDR application can include other tags that, when referenced by, for example, a style sheet language, cause the end-user communication device 40 to render the RDA content (including each RDA content constituent) with or without the MD content, to have a location, layout, size, shape, color, texture, font, special effect, backdrop, and the like, that is optimal for the particular RDA content and/or end-user communication device 40 to define a background for that particular RDA.

For instance, using the canvas tag in HTML5, a portion of a display screen on an end-user communication device 40 can be targeted for the RDA container (for example, as a new canvas window) for insertion of the RDA content 52 (shown in FIG. 3), including the height and width of the RDA container which might be measured from any of the corners (for example, an upper-left corner) of the display screen. The RDA container should match the size of the RDA content, except that the oddment 35 and milieu 53 can extend outside the boundaries of the RDA container.

The terms "a," "an," and "the," as used in this disclosure, means "one or more," unless expressly specified otherwise.

The term "backbone," as used in this disclosure, means a transmission medium that interconnects one or more computing devices or communicating devices to provide a path that conveys data signals and instruction signals between the one or more computing devices or communicating devices. The backbone can include a bus or a network. The backbone can include an ethernet TCP/IP. The backbone can include a distributed backbone, a collapsed backbone, a parallel backbone or a serial backbone.

The term "bus," as used in this disclosure, means any of several types of bus structures that can further interconnect to a memory bus (with or without a memory controller), a peripheral bus, or a local bus using any of a variety of commercially available bus architectures. The term "bus" can include a backbone.

The term "communication device," as used in this disclosure, means any hardware, firmware, or software that can transmit or receive data packets, instruction signals, data signals or radio frequency signals over a communication link. The communicating device can include a computer or a server. The communicating device can be portable or stationary.

The term "communication link," as used in this disclosure, means a wired or wireless medium that conveys data or information between at least two points. The wired or wireless medium can include, for example, a metallic conductor link, a radio frequency (RF) communication link, an Infrared (IR) communication link, or an optical communication link. The RF communication link can include, for example, WiFi, WiMAX, IEEE 302.11, DECT, OG, 1G, 2G, 3G, 4G, or 5G cellular standards, or Bluetooth. A communication link can include, for example, an RS-232, RS-422, RS-485, or any other suitable serial interface.

The terms "computer," "computing device," or "processor," as used in this disclosure, means any machine, device, circuit, component, or module, or any system of machines, devices, circuits, components, or modules that are capable of manipulating data according to one or more instructions. The terms "computer," "computing device" or "processor" can include, for example, without limitation, a processor, a microprocessor (µC), a central processing unit (CPU), a graphic processing unit (GPU), an application specific integrated circuit (ASIC), a general purpose computer, a super computer, a personal computer, a laptop computer, a palmtop computer, a notebook computer, a desktop computer, a workstation computer, a server, a server farm, a computer cloud, or an array or system of processors, µCs, CPUs, GPUs, ASICs, general purpose computers, super computers, personal computers, laptop computers, palmtop computers, notebook computers, desktop computers, workstation computers, or servers.

The terms "computing resource" or "computer resource," as used in this disclosure, means software, a software application, a web application, a web page, a computer application, a computer program, computer code, machine executable instructions, firmware, or a process that can be arranged to execute on a computing device as one or more computing resource processes.

The term "computing resource process," as used in this disclosure, means a computing resource that is in execution or in a state of being executed on an operating system of a computing device. Every computing resource that is created, opened or executed on or by the operating system can create a corresponding "computing resource process." A "computing resource process" can include one or more threads, as will be understood by those skilled in the art.

The terms "computer resource asset" or "computing resource asset," as used in this disclosure, means a computing resource, a computing device or a communicating device, or any combination thereof.

The term "computer-readable medium," as used in this disclosure, means any non-transitory storage medium that participates in providing data (for example, instructions) that can be read by a computer. Such a medium can take many forms, including non-volatile media and volatile media. Non-volatile media can include, for example, optical or magnetic disks and other persistent memory. Volatile media can include dynamic random-access memory (DRAM). Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read. The computer-readable medium can include a "cloud," which can include a distribution of files across multiple (e.g., thousands of) memory caches on multiple (e.g., thousands of) computers.

Various forms of computer readable media can be involved in carrying sequences of instructions to a computer. For example, sequences of instruction (i) can be delivered from a RAM to a processor, (ii) can be carried over a wireless transmission medium, or (iii) can be formatted according to numerous formats, standards or protocols, including, for example, WiFi, WiMAX, IEEE 302.11, DECT, 0G, 1G, 2G, 3G, 4G, or 5G cellular standards, or Bluetooth.

The term "database," as used in this disclosure, means any combination of software or hardware, including at least one computing resource or at least one computer. The database can include a structured collection of records or data organized according to a database model, such as, for example, but not limited to at least one of a relational model, a hierarchical model, or a network model. The database can include a database management system application (DBMS). The at least one application may include, but is not limited to, a computing resource such as, for example, an application program that can accept connections to service requests from communicating devices by sending back responses to the devices. The database can be configured to run the at least one computing resource, often under heavy workloads, unattended, for extended periods of time with minimal or no human direction.

The terms "including," "comprising" and their variations, as used in this disclosure, mean "including, but not limited to," unless expressly specified otherwise.

The term "network," as used in this disclosure means, but is not limited to, for example, at least one of a personal area network (PAN), a local area network (LAN), a wireless local area network (WLAN), a campus area network (CAN), a metropolitan area network (MAN), a wide area network (WAN), a metropolitan area network (MAN), a wide area network (WAN), a global area network (GAN), a broadband area network (BAN), a cellular network, a storage-area network (SAN), a system-area network, a passive optical local area network (POLAN), an enterprise private network (EPN), a virtual private network (VPN), the Internet, or the like, or any combination of the foregoing, any of which can be configured to communicate data via a wireless and/or a wired communication medium. These networks can run a variety of protocols, including, but not limited to, for example, Ethernet, IP, IPX, TCP, UDP, SPX, IP, IRC, HTTP, FTP, Telnet, SMTP, DNS, ARP, ICMP.

The term "server," as used in this disclosure, means any combination of software or hardware, including at least one computing resource or at least one computer to perform services for connected communicating devices as part of a client-server architecture. The at least one server application can include, but is not limited to, a computing resource such as, for example, an application program that can accept connections to service requests from communicating devices by sending back responses to the devices. The server can be configured to run the at least one computing resource, often under heavy workloads, unattended, for extended periods of time with minimal or no human direction. The server can include a plurality of computers configured, with the at least one computing resource being divided among the computers depending upon the workload. For example, under light loading, the at least one computing resource can run on a single computer. However, under heavy loading, multiple computers can be required to run the at least one computing resource. The server, or any if its computers, can also be used as a workstation.

The term "transmission," "transmit," "sent" or "send," as used in this disclosure, means the conveyance of data, data packets, computer instructions, or any other digital or analog information via electricity, acoustic waves, light waves or other electromagnetic emissions, such as those generated with communications in the radio frequency (RF) or infrared (IR) spectra. Transmission media for such transmissions can include coaxial cables, copper wire and fiber optics, including the wires that comprise a system bus coupled to the processor.

Devices that are in communication with each other need not be in continuous communication with each other unless expressly specified otherwise. In addition, devices that are in communication with each other may communicate directly or indirectly through one or more intermediaries.

Although process steps, method steps, or algorithms may be described in a sequential or a parallel order, such processes, methods and algorithms may be configured to work in alternate orders. In other words, any sequence or order of steps that may be described in a sequential order does not necessarily indicate a requirement that the steps be performed in that order; some steps may be performed simultaneously. Similarly, if a sequence or order of steps is described in a parallel (or simultaneous) order, such steps can be performed in a sequential order. The steps of the processes, methods or algorithms described in this specification may be performed in any order practical.

When a single device or article is described, it will be readily apparent that more than one device or article may be used in place of a single device or article. Similarly, where more than one device or article is described, it will be readily apparent that a single device or article may be used in place of the more than one device or article. The functionality or the features of a device may be alternatively embodied by one or more other devices which are not explicitly described as having such functionality or features.

What is claimed is:

1. A communication system for transmitting display content to an end-user communication device to be rendered on a display device, the communication system comprising:
  a processor that is arranged to:
    obtain, from a content provider communication device via a network interface, image content for display on the display device of the end-user communication device;
    analyze the image content obtained from the content provider communication device;
    create a throne portion based on the image content;
    create a headline based on the image content;
    create a background based on the image content; and
    generate rendering instructions for the throne portion, the headline, the background, and at least a portion of an image comprised in the image content; and
  a transmitter arranged to send, via a same or different network interface, the rendering instructions to the end-user communication device, wherein
  the rendering instructions comprise instructions for the end-user communication device to render:
    the headline on the throne portion and displayed partially in a container on the display device, and
    the at least a portion of an image stacked atop of and offset with respect to the background in the container on the display device.

2. The communication system of claim 1, wherein the processor is arranged to receive main display content,
wherein the transmitter is arranged to transmit the main display content to the end-user communication device to render at least a portion of the main display content outside of the container on the display device.

3. The communication system of claim 1, wherein the background includes a mirror image of the image content.

4. The communication system of claim 3, wherein the background includes at least one of a color overlay and a blurring overlay combined with the mirror image.

5. The communication system of claim 1, wherein the throne portion comprises a portion of a mirror image of the image content.

6. The communication system of claim 1, wherein the rendering instructions further comprise instructions to render at least one of textual content, headline content, source identifier content, Uniform Resource Locator content or a call-to-action selector.

7. The communication system of claim 1, wherein the rendering instructions include an instruction that, when executed by a web browser application on the end-user communication device, causes the end-user communication device to render the background in an upper portion of the container on the display device.

8. A computer-implemented method for transmitting display content to an end-user communication device to be rendered on a display device, the method comprising:
obtaining, by a processor from a content provider communication device via a network interface, image content for display on the display device of the end-user communication device;
analyzing, by the processor, the image content obtained from the content provider communication device;
creating, by the processor, a throne portion based on the image content;
creating, by the processor, a headline based on the image content;
creating, by the processor, a background based on the image content;
generating, by the processor, rendering instructions for the throne portion, the headline, the background, and at least portion of an image comprised in the image content; and
transmitting, via a same or different network interface, the rendering instructions to the end-user communication device, wherein
the instructions comprise instructions for the end-user communication device to render:
the headline on the throne portion and displayed partially in a container on the display device, and
the at least a portion of an image stacked atop of and offset with respect to the background in the container on the display device.

9. The computer-implemented method in claim 8, wherein the transmitting comprises transmitting main display content to the end-user communication device to render at least a portion of the main display content outside of the container on the display device.

10. The computer-implemented method in claim 8, wherein creating the background comprises generating a mirror image of the image content.

11. The computer-implemented method in claim 10, wherein creating the background comprises at least one of:
creating a color overlay; and
creating a blurring overlay.

12. The computer-implemented method in claim 11, wherein creating the background comprises combining the mirror image with at least one of the color overlay and the blurring overlay.

13. The computer-implemented method in claim 8, wherein creating the throne portion comprises generating a mirror image of the image content.

14. The computer-implemented method in claim 8, wherein the rendering instructions further comprise instructions to render at least one of textual content, headline content, source identifier content, Uniform Resource Locator content or a call-to-action selector.

15. The computer-implemented method in claim 8, wherein the rendering instructions include an instruction, when executed by a web browser application on the end-user communication device, cause the end-user communication device to render the background in an upper portion of the container on the display device.

16. A non-transitory computer-readable storage medium containing computer executable instructions that, when executed by a hardware processor of a first device, cause the processer to perform a method to transmit display content to a second device to be rendered on a display device, the method comprising:
obtaining, by the hardware processor from a content provider communication device via a network interface, image content for display on the display device of the second device;
analyzing, by the hardware processor, the image content obtained from the content provider communication device;
creating, by the hardware processor, a throne portion based on the image content;
creating, by the hardware processor, a headline based on the image content;
creating, by the hardware processor, a background based on the image content;
generating rendering instructions for the throne portion, the headline, the background, and at least a portion of an image comprised in the image content; and
transmitting, via a same or different network interface, the rendering instructions to the second device, wherein
the rendering instructions comprise instructions for the second device to render:
the headline atop of the throne portion and displayed partially in a container on the display device, and
the at least a portion of an image stacked atop of and offset with respect to the background in the container on the display device.

17. The non-transitory computer-readable storage medium in claim 16, wherein the transmitting comprises transmitting main display content to the end-user communication device to render at least a portion of the main display content outside of the container on the display device.

18. The non-transitory computer-readable storage medium in claim 16, wherein the method further comprises at least one of:
generating a mirror image of the image content to create the background;
creating a color overlay; and
creating a blurring overlay.

19. The non-transitory computer-readable storage medium in claim 18, wherein creating the background comprises combining the mirror image with at least one of the color overlay and the blurring overlay.

20. The non-transitory computer-readable storage medium in claim 16, wherein the rendering instructions further comprise instructions to render at least one of textual content, headline content, source identifier content, Uniform Resource Locator content or a call-to-action selector.

* * * * *